United States Patent [19]

Tsuyama

[11] Patent Number: 4,575,789
[45] Date of Patent: Mar. 11, 1986

[54] REFLEX REFLECTOR
[75] Inventor: Sadaharu Tsuyama, Osaka, Japan
[73] Assignee: Tsuyama Mfg. Co., Ltd., Japan
[21] Appl. No.: 694,504
[22] Filed: Jan. 24, 1985
[30] Foreign Application Priority Data Sep. 10, 1984 [JP] Japan .................... 59-137743[U]

[51] Int. Cl.$^4$ .............................................. F21V 7/00
[52] U.S. Cl. ..................................... 362/346; 350/97;
350/99; 362/72
[58] Field of Search ................... 362/72, 78, 341, 346,
362/347, 348, 349; 350/97, 99, 107; 301/37
CM; 280/289 R

[56] References Cited
U.S. PATENT DOCUMENTS

| 3,781,082 | 12/1973 | Linder | 350/99 |
|---|---|---|---|
| 3,901,554 | 8/1975 | Kennedy et al. | 350/99 |
| 3,924,928 | 12/1975 | Trimble | 350/99 |
| 3,951,517 | 4/1976 | Levy et al. | 350/99 |
| 3,960,437 | 6/1976 | Von Heck | 350/99 |
| 3,967,879 | 7/1976 | Tsuyama | 350/99 |
| 3,995,938 | 12/1976 | Olson | 350/97 |
| 4,006,877 | 2/1977 | Van Niel | 350/97 |

FOREIGN PATENT DOCUMENTS 2809100 9/1979 Fed. Rep. of Germany ........ 350/99

Primary Examiner—William A. Cuchlinski, Jr.
Attorney, Agent, or Firm—Allegretti, Newitt, Witcoff & McAndrews, Ltd.

[57] ABSTRACT

A reflex reflector (11) has a reflector body (12), and attaching means (13) which are provided on the right and left sides of the reflector body (12), and is adapted to be attached between spokes (5) of a spoked wheel. Each of the attaching means (13) includes a passage (14) for fitting a spoke (5) therein laterally of the wheel, and the passage (14) has lateral surfaces positioned laterally of the fitted spoke and back surfaces positioned at the back. The attaching means (13) further includes lateral projections (18, 19) projecting to the lateral surfaces of the passage (14) and adapted to make the width of the passage (14) smaller than the diameter of the spoke (5). The lateral projections (18, 19) have elasticity which allows the amount of projection from the lateral surfaces of the passage to be decreased, whereby the spoke (5) is allowed to move beyond the lateral projections (18, 19) to reach a predetermined position. The attaching means (13) further includes a back projection (20) projecting to the back projection of the passage (14), and the back surface (20) has elasticity which allows the amount of projection from the passage (14) to be decreased.

6 Claims, 10 Drawing Figures

REFLEX REFLECTOR

BACKGROUND OF THE INVENTION

1. Field of the Invention

This invention relates to a reflex reflector and particularly to a reflex reflector mounted on spokes of a wheel of a bicycle or the like.

2. Description of the Prior Art

If a bicycle crossing in front of an automobile has a reflex reflector mounted thereon, the reflector receives light from the headlights and glaringly reflects it. Thus, the driver can readily and positively ascertain the presence of the bicycle, a fact which is desirable from the standpoint of safety. Particularly, a reflex reflector mounted on spokes of a wheel has superior visibility since it is rotated along with the wheel.

Various types of reflex reflectors adapted to be mounted on spokes have heretofore been provided, but in most cases, such accessory parts as bolts and nuts are used when they are mounted on spokes. FIG. 9 shows one such conventional reflex reflector. The illustrated reflex reflector 1 is formed over substantially all surface except the middle portion 2 with a reflective surface. At the middle portion 2 not formed with a reflective surface, a screw 3 is disposed on the front side and a screw receiving portion (not shown) is disposed on the rear side. The reflex reflector 1 is mounted on a spoke 5 extending from a rim 5 to a hub (not shown) by utilizing said screw 3 and screw receiving portion.

Such reflex reflector 1 has the following drawbacks.

First, besides the reflector body, such accessory parts as the screw 3 and screw receiving portion are required, increasing the number of parts, a fact which is not desirable from the standpoint of parts control and cost. Further, the mounting operation using bolts and nuts is troublesome and takes time. Further, to install the bolt 3, in the example shown in FIG. 9, it is necessary to provide a region at the middle portion 2 where no reflective surface is formed. As a result, the reflective performance is lower than in a reflex reflector which is formed with a reflective surface throughout its surface.

As found in Japanese Laying-Open Gazette No. 124473/1984 (Japanese Patent Application No. 230122/1982), intended to eliminate said drawbacks, there has been proposed an arrangement wherein both sides of a reflector are formed with wing portions of synthetic resin adapted to grip spokes. FIG. 10 shows such reflex reflector. The illustrated reflex reflector 6 has wing portions 7 and 8 on its opposite sides. The wing portions 7 and 8 are designed to grip spokes from the front and back sides, i.e., from the paper front and back sides, to thereby mount the reflex reflector 6 on the spokes 5. In mounting, first, the reflex reflector 6 is placed above the position where it is to be mounted between the two spokes 5. Subsequently, as shown in dash-dot and dash-two-dot lines 9 and 10, the reflex reflector 6, while being vertically jolted at its opposite sides, is lowered until it reaches the position where the wing portions 7 and 8 grip the spokes 5.

Therefore, with the reflex reflector 6 shown in FIG. 10, a relatively large spacing Za must be provided between the reflex reflector 6 and the rim 4 for enabling and facilitating the operation of mounting on the spokes. Further, a loss spacing Zb proportional to the amplitude of the reflector involved in the mounting operation must be provided between the reflex reflector and the spoke.

Originally, from the standpoint of visibility, it is preferable that the attaching position of the reflector mounted on spokes be as near to the rim as possible. This is endorsed by the fact that some countries have standards stipulating that the attaching position of the reflector is to be closely adjacent to the rim. Further, to promote visibility or reflective performance, it is desired that the horizontal length of the reflective surface of the reflector be as great as possible. Therefore, in the reflex reflector of the type shown in FIG. 10, it is desirable to make the horizontal length of the reflective surface as close to the spacing of the two spokes as possible. In other words, ideally, it is desired that the dimensions Za and Zb shown in FIG. 10 be as small as possible. However, in the conventional reflex reflector 6 shown in FIG. 10, as described above, the dimensions Za and Zb are necessarily larger.

Further, the diameter of the spokes of bicycles varies according to the type of bicycle. Usually, the conventional reflex reflector 6 shown in FIG. 10 is produced on the basis of the spokes of predetermined diameter. Thus, an attempt to forcibly mount the reflex reflector 6 on spokes having a greater diameter than the predetermined value would result in damage to the wing portions 7 and 8. To avoid this, it is necessary to prepare individual reflectors for various spoke diameters, which is very disadvantageous from the standpoint of cost.

SUMMARY OF THE INVENTION

This invention has been made with the above situation in mind, and an object thereof is to provide a reflex reflector adapted to be mounted on spokes in a very simple operation without using screws or bolts or other accessory parts.

Another object of this invention is to provide a reflex reflector capable of being attached as close to the rim of a wheel as possible and forming a maximum of reflective surface in that desired attaching position.

A further object of this invention is to provide a reflex reflector which can be used in common with spokes of different diameters without any trouble.

A reflex reflector according to this invention is adapted to be attached between spokes of a spoked wheel and comprises a reflector body, and attaching means provided on the right and left ends of said reflector body. Each attaching means includes a passage for fitting on a spoke laterally of the wheel. This passage has right and left lateral surfaces positioned on both sides of the spoke on which it is fitted, and a back surface positioned on the back. The attaching means includes a lateral projection projecting to the lateral surface of said passage to make the width of said passage smaller than the diameter of the spokes. The lateral projection has elasticity which allows the amount of projection from the lateral surface of said passage to be decreased. Therefore, the spokes are allowed to reach the predetermined position beyond said lateral projection. The attaching means further includes a back projection projecting to the back surface of said passage. The back projection has elasticity which allows the amount of projection from said passage to be decreased.

According to the invention, when the reflex reflector is simply pressed against spokes laterally of the wheel, it can be mounted on the spokes in a very simple operation without using such accessory parts as screws or bolts since the attaching means provided on the right and left sides of the reflector body are arranged to grip the spokes. Further, in mounting, since it is only necessary to press in the reflector rather than attaching it while alternately moving the sides of the reflector between the two spokes as in the prior art, the reflector can be attached in as forced a position as possible and, moreover, at that desired position the largest possible reflective surface, i.e., a reflective surface whose width is substantially equal to the spacing of the spokes, can be formed. Further, since the lateral and back projections projecting to the lateral and back surfaces of the passages of the attaching means to be fitted on spokes have elasticity which allows the amount of projection to be decreased, the reflex reflector can be used in common with spokes of different diameters without any trouble and can positively grip the spokes.

These objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 2:
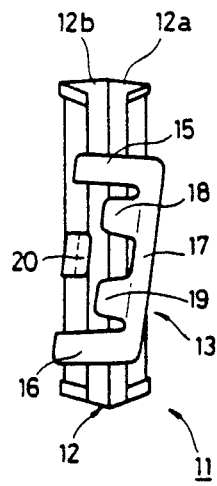
FIG. 2 is a side view of the embodiment of the invention.
Figure 1:
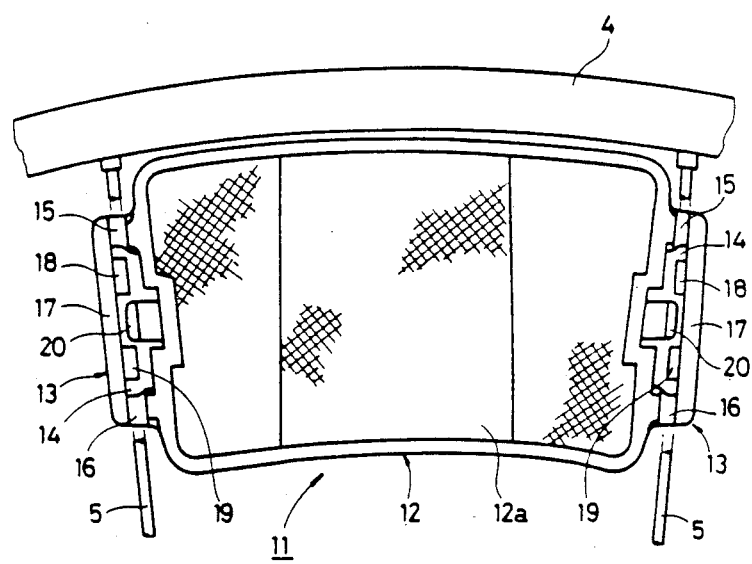
FIG. 1 is a front view showing an embodiment of the invention.
Figure 3:
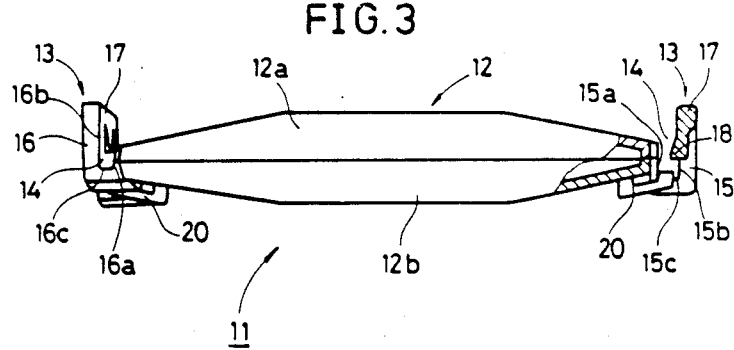
FIG. 3 is a plan view of the embodiment of the invention shown with a portion thereof broken away.

FIGS. 1 through 3 show an embodiment of this invention. A reflex reflector 11 shown therein is adapted to be attached between two spokes 5 extending from a rim 4 to a hub (not shown) and comprises a reflector body 12 and attaching means 13 provided on the right and left sides of the reflector 12. In addition, in FIG. 1, the spokes 5 are shown partly broken for convenience' sake.

The reflector body 12 is made by placing two substantially symmetrical reflector members 12a and 12b one upon the other and then joining them together as by ultrasonic welding. Each of the reflector members 12a and 12b has on its front surface a reflective surface whose width is equal to the spacing of the two spokes 5 and on its back surface a reflective element.

The attaching means 13 symmetrically disposed on the right and left sides of the reflector body 12 are integral with one reflector member 12b. Each attaching means 13 includes a passage 14 for fitting a spoke 5 therein laterally of the wheel, i.e., from the paper front side in FIG. 1. The passage 14 has its size defined by two U-shaped portions 15 and 16 extending in U form from the side of the reflex reflector member 12b. The two U-shaped portions 15 and 16 are positioned along the direction of the length of the spoke 5 and their upper end portions are interconnected by a rod portion 17. Further, as shown in FIGS. 1 and 2, each passage 14 defined by the two U-shaped portions 15 and 16 is positioned to overlie the inclined spoke 5. The passage 14 has right and left lateral surfaces positioned on both sides of the spoke 5 fitted therein and a back surface positioned at the back. Referring to FIG. 3, the opposed lateral surfaces of the passage 14 are defined by inner lateral surfaces 15a, 15b and 16a, 16b of the two U-shaped portions 15 and 16, and the back surface of the passage 14 is defined by the bottom surfaces 15c, 16c of the two U-shaped portions 15, 16.

As shown, each rod portion 17 is provided with two lateral projections 18 and 19 projecting to one lateral surface of the passage 14. Further, the reflector member 12b is provided with a back projection 20 which is positioned between the two U-shaped portions 15 and 16 and whose front end projects to the back surface of the passage 14. The back projection 20 is preferably positioned between the two lateral projections 18 and 19.

Figure 4:
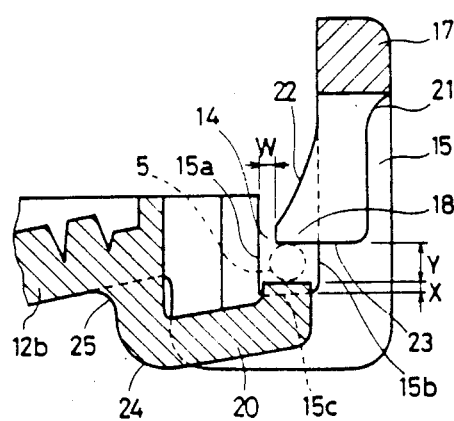
FIG. 4 is an enlarged sectional view of the principal portion of the embodiment of the invention.

In FIG. 4, the U-shaped portion 15, lateral projection 18, and back projection 20 are shown enlarged. Since the two lateral projections 18 and 19 are basically of the same construction, one lateral projection 18 alone will be described below.

Figure 5:
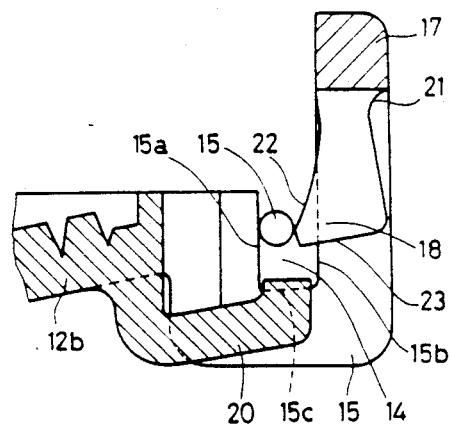
FIG. 5 is a view showing a state established after a lateral projection 18 is pressed from the state of FIG. 4 by a spoke 5 and flexed.

The lateral projection 18 projects to one lateral surface of the passage 14 defined by the U-shaped portions 15 and 16, as described above, with the distance W between the projection top and the other lateral surface of the passage 14 being smaller than the diameter of a spoke 5 to be fitted in the passage 14. Further, the lateral projection 18 has elasticity which allows the amount of projection from the lateral surface of the passage 18 to be decreased. More particularly, as shown in FIG. 5, when the spoke 5 is to be fitted in the passage 14, the lateral projection 18 is flexed by a pressing force from the lateral projection 18, thereby allowing the spoke 5 to move beyond the lateral projection 18 until it reaches a predetermined position shown in dotted lines in FIG. 4. After the spoke has passed by the lateral projection 18, the latter returns to the position shown in FIG. 4 under its own elastic force, thus preventing the spoke from slipping out of the passage 14.

To ensure that said reflection of the lateral projection 18 takes place smoothly, the connecting portion 21 between the lateral projection 18 and the rod portion 17 is preferably rounded. Further, to facilitate the introduction of the spoke 5 into the passage 14, the lateral projection 18 preferably has in inclined surface 22 which enables the width of the passage 14 to decrease gradually as the projection top of said lateral projection 18 is approached. More preferably, to prevent the spoke 5 in the predetermined position from slipping out of the passage 14, the surface of the lateral projection 18 opposed to the back surface of the passage 14, i.e., the abutment surface 23 adapted to abut against the spoke 5 is substantially perpendicular to the lateral surface of the passage 14.

Referring to FIG. 4, the back projection 20 integral with the reflector member 12b has its front end projecting to the back surface of the passage 14, as described above. That is, the front end of the back projection 20 is positioned at a level higher by the dimension X that the back surface of the passage defined by the bottom surface 15c of the U-shaped portion 15. The back projection 20 has elasticity which allows the amount of projection X form the back surface of the passage to be decreased. Stated concretely, when the back projection 20 is pressed by the spoke 5 fitted in the passage 14, it is flexed in the counterclockwise direction and then functions to bring the spoke 5 closer to the abutment surface 23 of the lateral projection 18. Therefore, the spoke 5 will be gripped between the abutment surface 23 of the lateral projection 18 and the back projection 20.

To ensure that said flection of the back projection 20 takes place smoothly, preferably the corners 24 and 25 of the back projection 20 are suitably rounded.

The relation between the distance between the abutment surface 23 of the lateral projection 23 and the front end of the back projection 20 and the amount of projection X of the back projection 20 from the back surface of the passage is such that even spokes of different diameters can be gripped between the back projection 20 and the lateral projection 18. For example, if spokes whose diameters vary from 1.8 mm to 2.6 mm are to be gripped, the dimension Y is such a distance as to be capable of gripping the spoke of the smallest diameter and the dimension X is such a travel distance as to be capable of gripping the spoke of the largest diameter. That is, these distances are selected within such a range as to enable them to grip spokes of different diameters by the elastic force of the back projection 20.

Figure 6:
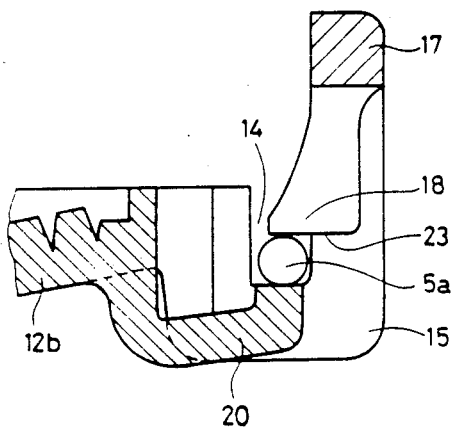
FIG. 6 is a view showing a state established after a back projection 20 is pressed from the state of FIG. 4 by a spoke 5a and flexed.

FIG. 6 shows a state in which a spoke 5a of the largest diameter is gripped between the lateral projection 18 and the back projection 20. As is clear from a comparison between FIGS. 4 and 6, in FIG. 6 since the spoke 5a is gripped between the front end of the back projection 20 and the abutment surface 23 of the lateral projection 18, the back projection 20 is flexed to a great extent. It goes without saying that in order to lead the spoke 5a of the largest diameter to the predetermined position, the lateral projection 18 will flex to a greater extent than in the case of the spoke 5.

Figure 7:
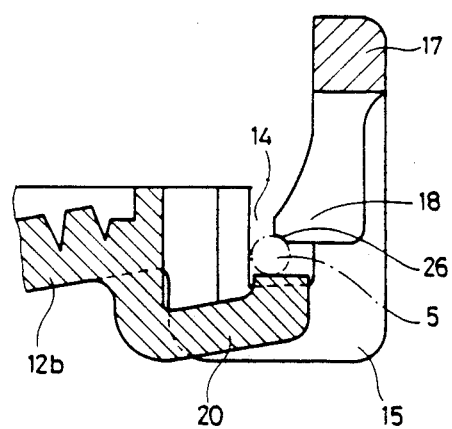
FIG. 7 is a sectional view, shown enlarged, of the principal portion of another embodiment of the invention.

In FIG. 7, the principal portion of another embodiment of this invention. In this embodiment, the lateral projection 18 has a sufficiently large arcuate surface 26 to contact the outer surface of the spoke 5. The arcuate surface 26 acts to press the spoke 5 against one lateral surface of the passage 14 when the spoke 5 is led to the predetermined position. Thus, according to the embodiment shown in FIG. 7, as compared with the embodiment shown in FIG. 4, the pressing force on the spoke 5 is high, and the sideways rattling movement of the reflex reflector after mounted can be prevented.

Figure 8:
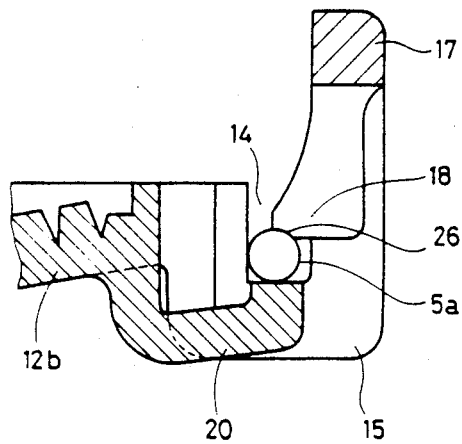
FIG. 8 is a view showing a state established after a back projection 20 is pressed from the state of FIG. 7 by a spoke 5a and flexed.
Figure 9:
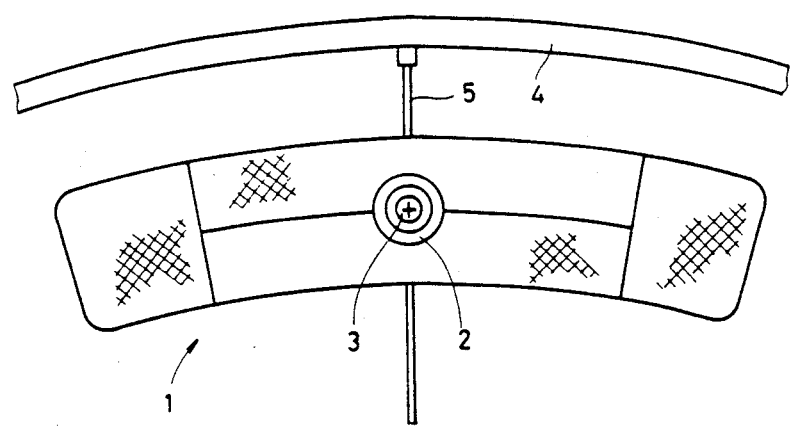
FIG. 9 is a view showing a state in which a conventional reflex reflector 1 is mounted between two spokes 5.
Figure 10:
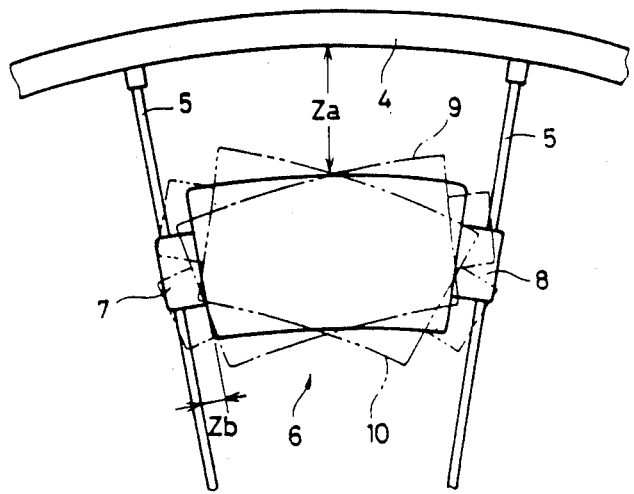
FIG. 10 is a view showing a state in which a conventional reflex reflector 6 is mounted between two spokes 5, clarifying the operation for mounting the reflex reflector 6.

FIG. 8 shows a state in which the spoke 5a of the largest diameter is gripped between the arcuate surface 26 of the lateral projection 18 and the front end of the back projection 20. A comparison between FIGS. 7 and 8 shows that in FIG. 8, the back projection 20 is flexed to a great extent. In addition, the size of the arcuate surface 26 is arbitrary. Further, both of the two lateral projections 18 and 19 may be provided with the arcuate surface 26 or only one of them, e.g., the lateral projection 18, which is positioned nearer to the rim, may be provided with it.

In the embodiments described above, the attaching means 13 which constitute the mechanism for holding spokes have been integral with one deflector member 12b. However, the invention is not limited thereto. For example, they may be formed on both of the reflector members 12a and 12b. Alternatively, the attaching means 13 may be formed of a different material and then attached to the sides of the reflector body 12.

Although the present invention has been described and illustrated in detail, it is clearly understood that the same is by way of illustration and example only and is not to be taken by way of limitation, the scope of the present invention being limited only by the terms of the appended claims.

What is claimed is:
1. A reflex reflector having a reflector body (12) and attaching means (13) provided on the right and left sides of said reflector body (12) and adapted to be attached between spokes (5) of a spoked wheel,
said reflex reflector being characterized in that:
each of said attaching means (13) includes a passage (14) for fitting a spoke (5) therein laterally of the wheel, said passage (14) having lateral surfaces (15a, 15b, 16a, 16b) positioned laterally of the fitted spoke (50) and back surfaces (15c, 16c) positioned at the back;
said attaching means (13) further includes lateral projections (18, 19) projecting to the lateral surfaces (15a, 15b, 16a, 16b) of said passage (14) and adapted to make the width of the passage (14) smaller than the diameter of the spoke (5), said lateral projections (18, 19) having elasticity which allows the amount of projection from the lateral surfaces (15a, 15b, 16a, 16b) of the passage (14) to be decreased, whereby the spoke (15) is allowed to move beyond said lateral projections (18, 19) to reach a predetermined position; and
said attaching means (13) further includes a back projection (20) projecting to the back surfaces (15c, 16c) of said passage (14), said back projection (20) having elasticity which allows the amount of projection from said passage (14) to be decreased.

2. A reflex reflector as set forth in claim 1, wherein said attaching means (13) are integral with said reflector body (12).

3. A reflex reflector as set forth in claim 1, wherein said lateral projections (18, 19) each have an inclined surface (22) which as capable of gradually decreasing the width of said passage (14) as the projection tops of said lateral projections (18, 19) are approached, so that the spoke (5) can easily move beyond the lateral projections (18, 19) to reach the predetermined position.

4. A reflex reflector as set forth in claim 1, wherein the surfaces of said lateral projections (18, 19) opposed to the back surfaces (15c, 16c) of said passage (14) are substantially perpendicular to the lateral surfaces (15a, 15b, 16a, 16b) of said passage (14).

5. A reflex reflector as set forth in claim 1, wherein said lateral projections (18, 19) each have an arcuate surface adapted to abut against the spoke (5) when the latter is in the predetermined position so as to prevent the sideways rattling movement of the reflex reflector.

6. A reflex reflector as set forth in claim 1, wherein said lateral projections (18, 19) are two in number and said back projection (20) is positioned between said two lateral projections (18, 19).

* * * * *